(12) United States Patent
Fukui et al.

(10) Patent No.: US 7,522,824 B2
(45) Date of Patent: Apr. 21, 2009

(54) PHOTOGRAPHING APPARATUS PHOTOGRAPHING METHOD AND COMPUTER PROGRAM

(75) Inventors: Satoshi Fukui, Kato (JP); Takayuki Sugiura, Kato (JP); Atsushi Miki, Kato (JP); Shuji Kimura, Kato (JP); Kiyoshi Chinzei, Kato (JP); Mieko Nakano, Kato (JP); Naoyuki Fujimoto, Kato (JP); Mitsuhiro Gotoh, Kato (JP); Toshio Endoh, Kawasaki (JP); Takahiro Aoki, Kawasaki (JP); Mitsuaki Fukuda, Kawasaki (JP); Masaki Watanabe, Kawasaki (JP); Shigeru Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 161 days.

(21) Appl. No.: 10/550,489

(22) PCT Filed: Mar. 28, 2003

(86) PCT No.: PCT/JP03/03987

§ 371 (c)(1),
(2), (4) Date: Sep. 26, 2005

(87) PCT Pub. No.: WO2004/088979

PCT Pub. Date: Oct. 14, 2004

(65) Prior Publication Data
US 2006/0210256 A1 Sep. 21, 2006

(51) Int. Cl.
G03B 29/00 (2006.01)

(52) U.S. Cl. .............. 396/14; 396/65; 396/67; 396/68; 396/69; 396/70; 396/263; 396/266; 340/5.52; 340/5.53; 340/5.8; 340/5.81; 340/5.82; 340/5.83; 348/169; 382/115

(58) Field of Classification Search ................ 382/115; 340/5.52, 5.53, 5.8, 5.81, 5.82, 5.83; 396/14, 396/263, 266
See application file for complete search history.

(56) References Cited

U.S. PATENT DOCUMENTS

| 4,699,149 | A | * | 10/1987 | Rice | 600/475 |
| 4,768,876 | A | * | 9/1988 | Okino | 356/4.07 |
| 5,027,215 | A | | 6/1991 | Takayama et al. | |
| 5,204,709 | A | * | 4/1993 | Sato | 396/263 |

(Continued)

FOREIGN PATENT DOCUMENTS

JP 60-190078 9/1985

(Continued)

OTHER PUBLICATIONS

Korean Patent Office Action, mailed Oct. 31, 2006, and issued in corresponding Korean Patent Application No. 10-2005-7006321.

Primary Examiner—W. B. Perkey
Assistant Examiner—Michael A Strieb
(74) Attorney, Agent, or Firm—Staas & Halsey LLP

(57) ABSTRACT

An image taking device (1), which takes an image of an object by focusing reflected light from the object on an image sensor (212), is provided with a distance measuring sensor (27) for measuring a distance between the object and the image taking device (1), and means for controlling exposure time of the image sensor (212) upon taking an image in accordance with a measurement result.

16 Claims, 11 Drawing Sheets

U.S. PATENT DOCUMENTS

| | | | | |
|---|---|---|---|---|
| 5,373,343 | A | * | 12/1994 | Nonaka ........................ 396/95 |
| 5,870,167 | A | * | 2/1999 | Knopp et al. ................ 351/212 |
| 6,377,699 | B1 | * | 4/2002 | Musgrave et al. ........... 382/117 |

FOREIGN PATENT DOCUMENTS

| | | | |
|---|---|---|---|
| JP | 5-95509 | | 4/1993 |
| JP | 7-21373 | | 1/1995 |
| JP | 7-284086 | | 10/1995 |
| JP | 8-508419 | | 9/1996 |
| JP | 8-279954 | | 10/1996 |
| JP | 08-279954 | * | 10/1996 |
| JP | 8-317278 | | 11/1996 |
| JP | 11-203452 | | 7/1999 |
| JP | 2000-36032 | | 2/2000 |
| JP | 2000-036032 | * | 2/2000 |
| JP | 2000-316125 | | 11/2000 |
| JP | 2001-137241 | | 5/2001 |
| JP | 2001-230970 | * | 8/2001 |
| JP | 2002-150294 | | 5/2002 |
| JP | 2002-214693 | | 7/2002 |
| WO | WO 94/22370 | | 10/1994 |

* cited by examiner

| OUTPUT VALUE FROM DISTANCE MEASURING SENSOR | DISTANCE (cm) | EXPOSURE TIME (ms) | GAIN |
|---|---|---|---|
| | IMPOSSIBLE CONTROL | | |
| 235~214 | 2~3 | 80 | 60 |
| 213~180 | ~4 | 85 | 60 |
| 179~156 | ~5 | 85 | 60 |
| 155~136 | ~6 | 85 | 60 |
| 135~120 | ~7 | 88 | 60 |
| 119~108 | ~8 | 90 | 60 |
| 107~99 | ~9 | 95 | 60 |
| 98~93 | 9~ | 100 | 60 |

6DB

| USER ID | CHARACTERISTIC INFORMATION |
|---|---|
| A001 |  71a(71) |
| A002 |  71b(71) |
| A003 |  71c(71) |
| ⋮ | ⋮ |

PHOTOGRAPHING APPARATUS PHOTOGRAPHING METHOD AND COMPUTER PROGRAM

This application is based on and hereby claims priority to International Application No. PCT/JP03/03987 filed on Mar. 28, 2003, the contents of which are hereby incorporated by reference.

TECHNICAL FIELD

The present invention relates to a noncontact type image taking device.

BACKGROUND ART

Conventionally, there is a technique proposed for identifying a person and authenticating the person in accordance with a physical characteristic of a human body. A physical characteristic obtained by an image taking device is compared with a physical characteristic that is registered in advance, so that the personal identification or the personal authentication is performed.

Image taking devices can be divided broadly into a contact type in which the device touches the human body and a noncontact type in which the device does not touch the human body. A noncontact type is desired in a place where an indefinite number of people uses from viewpoints of resistance to soiling, a hygienic aspect and psychological inhibition.

For example, if a contact type device is used for security of a facility, it is necessary to check every time whether or not a person who tries to enters the facility is permitted to enter. Namely, the device is frequently touched by people. Therefore, a glass face that is touched with a human skin may become dirty. As a result, the image taking process cannot be performed appropriately, and a correct result may not be obtained. For this reason, a noncontact type device is desired in a place where the authentication is performed frequently.

Similarly in the case where it is used for a control of entering and leaving a facility, image taking process should be performed ever time when a person enters or leaves the facility. In this case too, the contact type device is touched by people frequently. Therefore, a glass face that is touched with a hand may become dirty, so that the image taking process cannot be performed appropriately. In addition, a hygienic problem or a psychological inhibition may be caused about touching the dirty face. For this reason, a noncontact type device is desired.

A noncontact type is preferred to a contact type also in the case where it is used in a place with a strict hygienic rule such as a medical institute or a research institute. In addition, needs of noncontact products are increasing recently as a social trend as understood from that various antibacterial goods and hygienic goods have becomes hit goods from viewpoints of a hygienic problem or a psychological inhibition. In the case of taking an image of a moving object, the contact type device cannot be used for such purpose.

However, it is difficult to set a subject at the same position by the noncontact type device every time of taking an image. Therefore, luminance of an obtained image may vary every image taking process. In this case, it may be difficult to authenticate a person because of a mismatch between a pattern of the obtained image and a pattern of the image that was taken in advance.

In addition, in the noncontact type device, a portion except the subject, i.e. a background portion may be included in the image. Then, it may be difficult to authenticate a person because of a mismatch between a pattern of the obtained image and a pattern of the image that was taken in advance.

There are proposed some methods for deleting a background portion, but each of them has a problem. For example, the method described in the patent document 1 below obtains movement information of an image by a differential between frames and accumulates the same, thereby determines that a pixel without any movement in a past predetermined period belongs to the background area for obtaining the background image. However, it is difficult in this method to distinguish the object from the background when the object having a uniform color, e.g., a white sheet of paper passes the front of a camera. The method described in the patent document 2 has a similar problem.

The method described in the patent document 3 detects a depth of an image so that a foreground is separated from a background in accordance with the depth. However, this method needs a device for detecting the depth that will be a large scale and expensive. The method described in the patent document 4 has a similar problem.

An object of the present invention is to solve such problems by providing a noncontact type image taking device that can take an image of high accuracy easily.

Patent Document 1:
    Japanese unexamined patent publication No. 7-284086

Patent Document 2
    Japanese unexamined patent publication No. 2002-150294

Patent Document 3
    Japanese unexamined patent publication No. 5-95509

Patent Document 4
    Japanese unexamined patent publication No. 2001-137241

DISCLOSURE OF THE INVENTION

An image taking device according to the present invention, which is an image taking device for taking an image of an object by focusing reflected light from the object on a light receiving portion, includes a measuring portion for measuring a distance between the object and the image taking device and an exposure control portion for controlling exposure time of the light receiving portion upon taking an image in accordance with the measurement result of the measuring portion.

Moreover, an image sensor such as a CMOS sensor or a CCD is used as means for converting the received light into an electric signal. Instead of the exposure control portion, a gain control portion is provided for controlling an output gain of the image sensor in accordance with a measurement result of the measuring portion.

Moreover, the device further includes a posture determining portion for determining whether or not the subject surface of the object is perpendicular to an axis along a shooting direction of the image taking device and an image taking control portion for controlling so as to taking an image of the object if it is determined by the posture determining portion that the subject surface of the object is perpendicular to an axis along the shooting direction of the image taking device. The measuring portion measures distances between the image taking device and at least two points in the subject surface of the object as the distance, and the posture determining portion determines whether or not the subject surface of the object is perpendicular to the axis along the shooting direction of the image taking device in accordance with the measurement results of the measuring portion for the points.

Moreover, the device further includes a guiding portion for guiding so that the subject surface becomes perpendicular to the axis along the shooting direction of the image taking device by producing different signs between the case where it is determined that the subject surface of the object is perpendicular to the axis along the shooting direction of the image taking device and the case where it is determined that the subject surface of the object is not perpendicular to the same.

Moreover, the device further includes a still determining portion for determining whether or not the object is still in accordance with the measurement result of the measuring portion that is obtained at an interval of a predetermined time and an image taking control portion for controlling so as to take an image of the object if it is determined that the object is still by the still determining portion.

Moreover, the device further includes a background storage portion for storing a background image without the object and an extracting portion for extracting an image that includes only the object by comparing the background image with an image obtained by taking an image of the object. The image taking control portion controls so as to take an image when the distance is not measured by the measuring portion for obtaining the background image.

BRIEF DESCRIPTION OF THE DRAWINGS

FIG. 7 shows an example of a distance exposure table.

BEST MODE FOR CARRYING OUT THE INVENTION

The present invention will be described in more detail with reference to the attached drawings.

Figure 1:
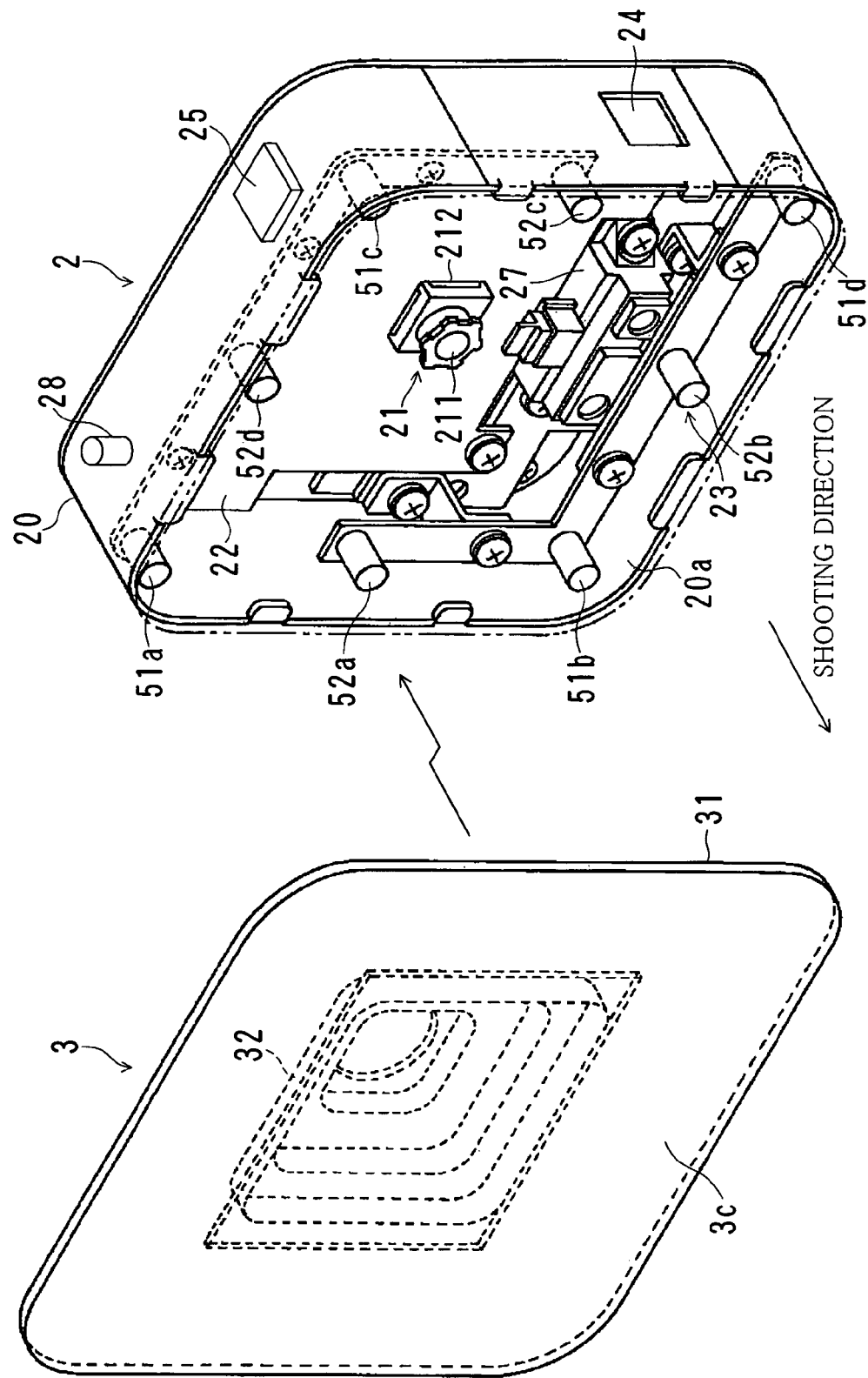
FIG. 1 is a perspective view showing an overall structure of an image taking device.
Figure 2:
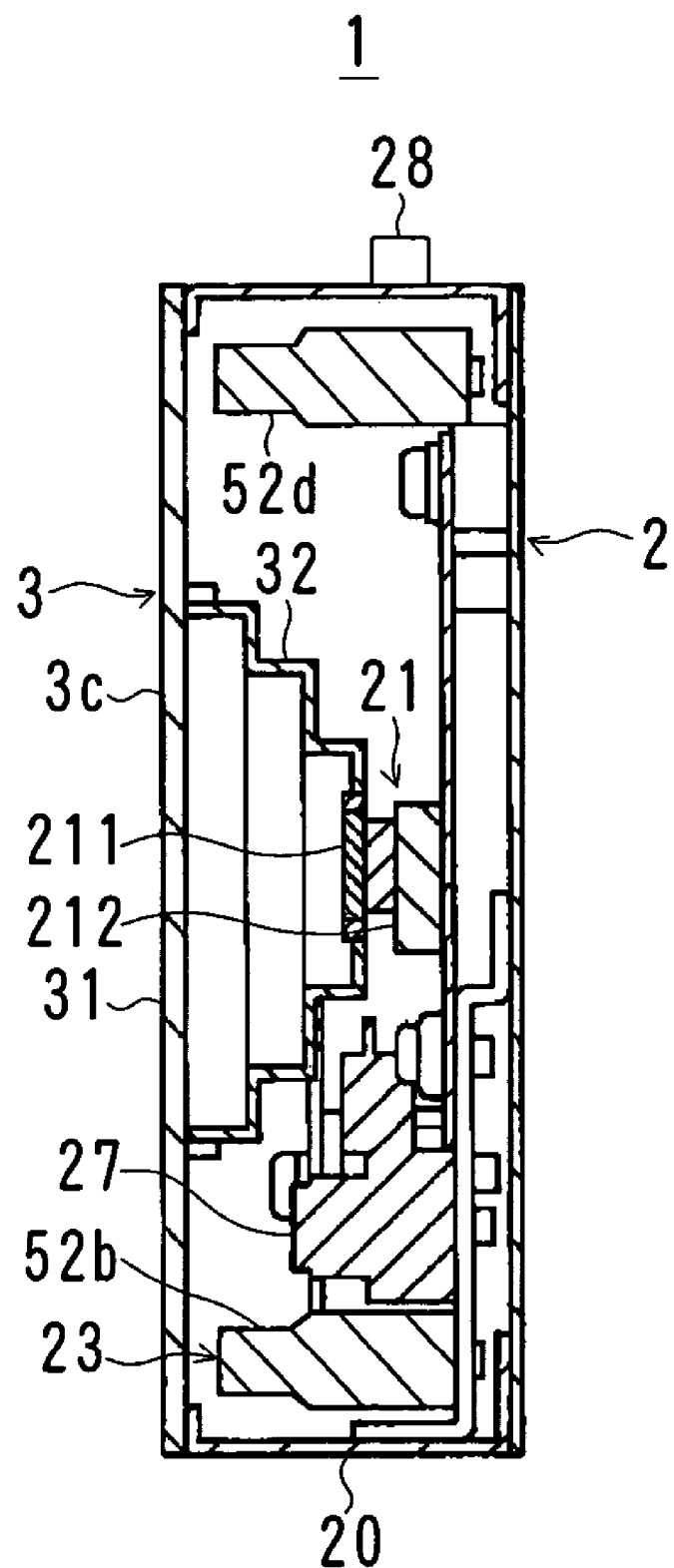
FIG. 2 is a cross section of the image taking device at the middle portion viewed from the side.
Figure 3:
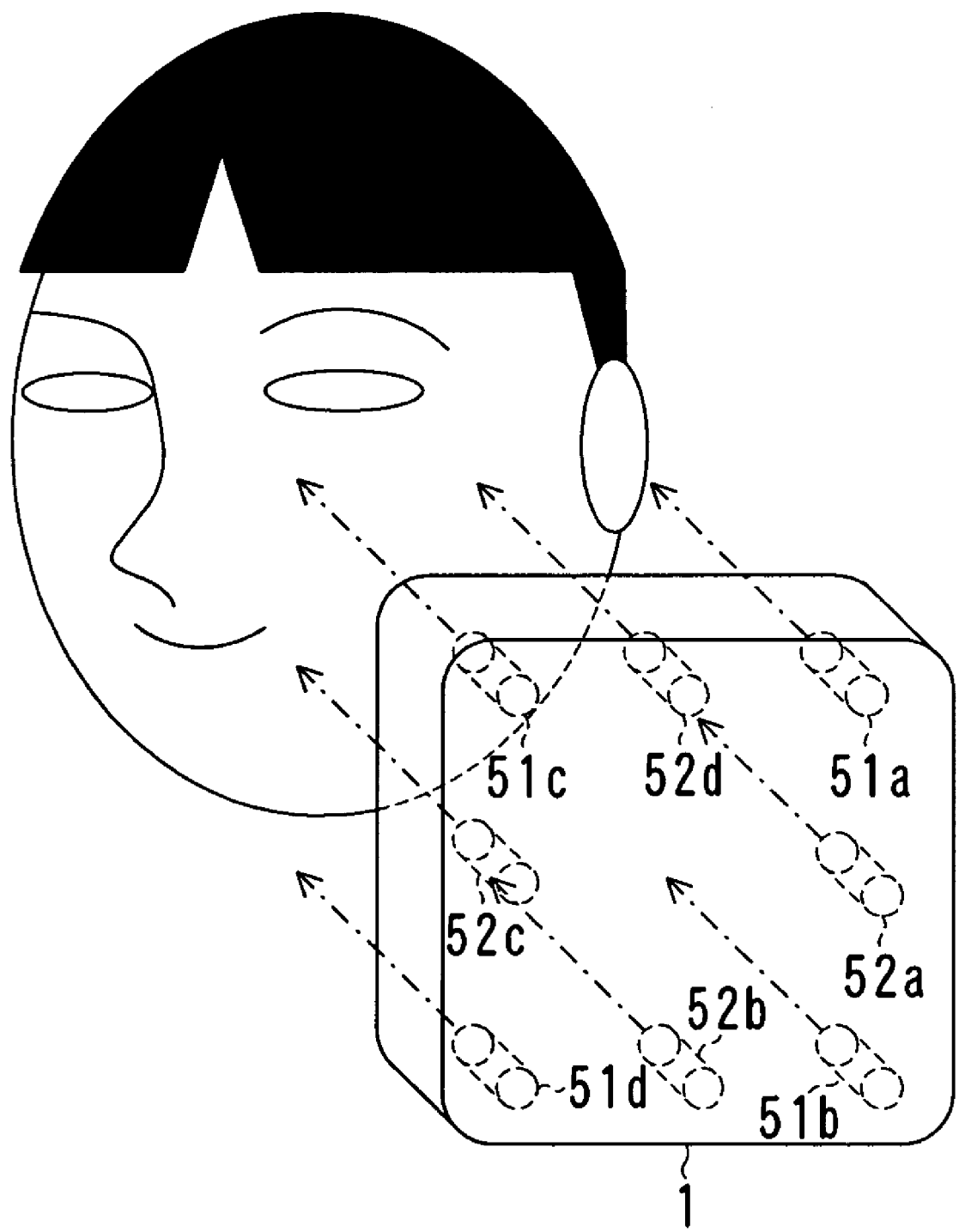
FIG. 3 shows an example of a situation in taking an image of a left cheek.
Figure 4:
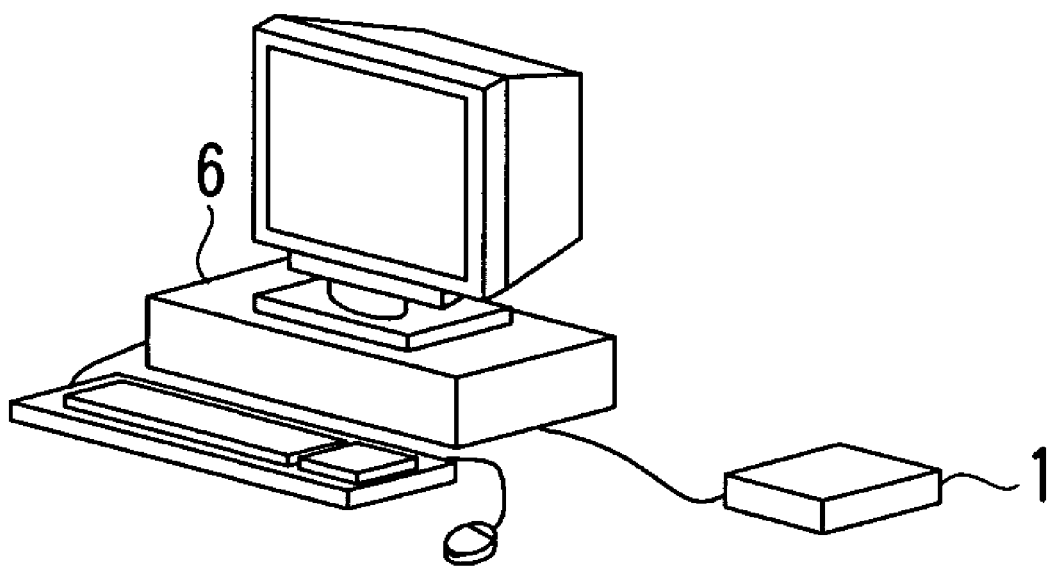
FIG. 4 shows an example of a connection between the image taking device and a personal computer.
Figure 5:
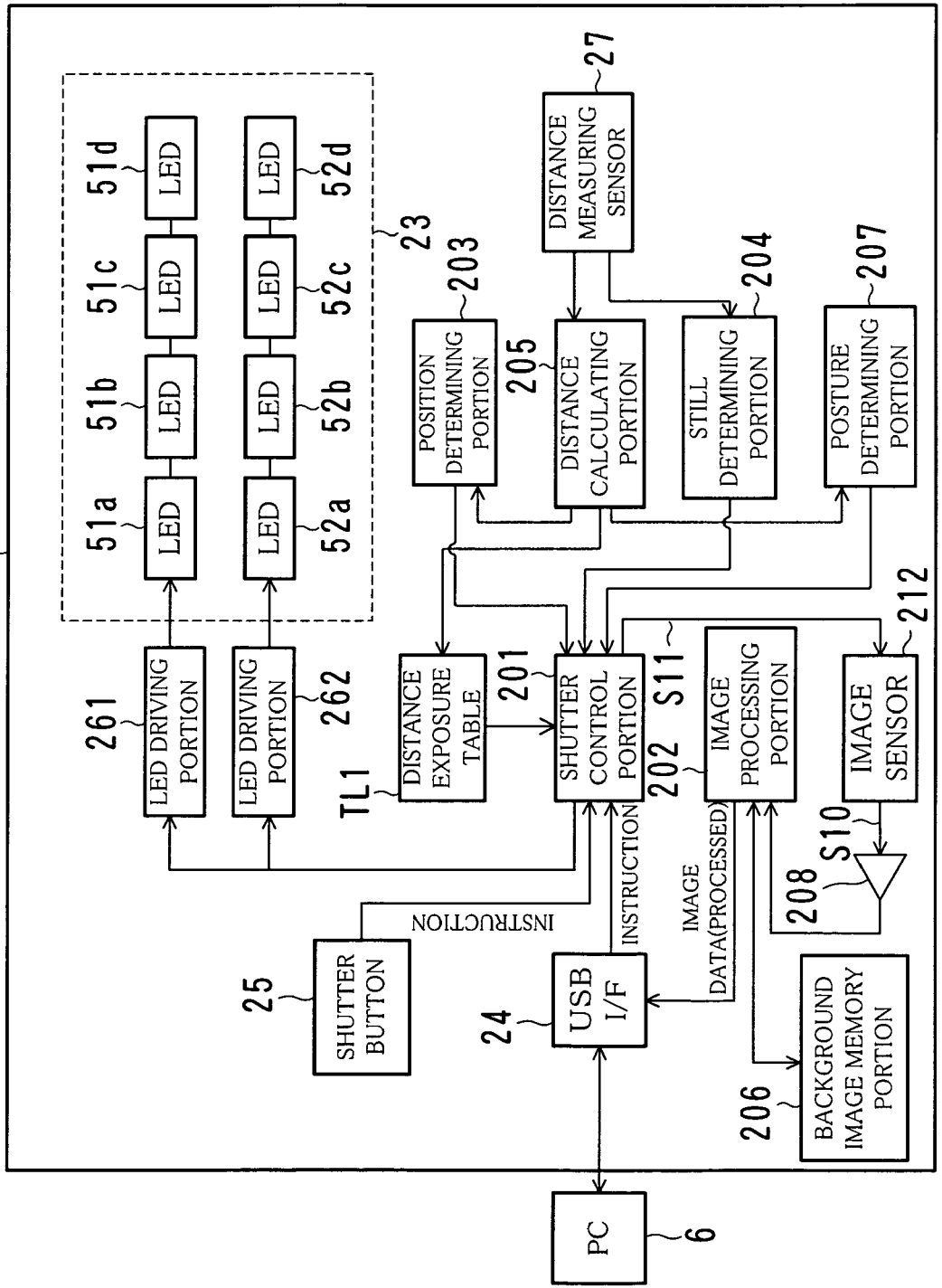
FIG. 5 is a block diagram showing an example of a functional structure of the image taking device.
Figure 6:
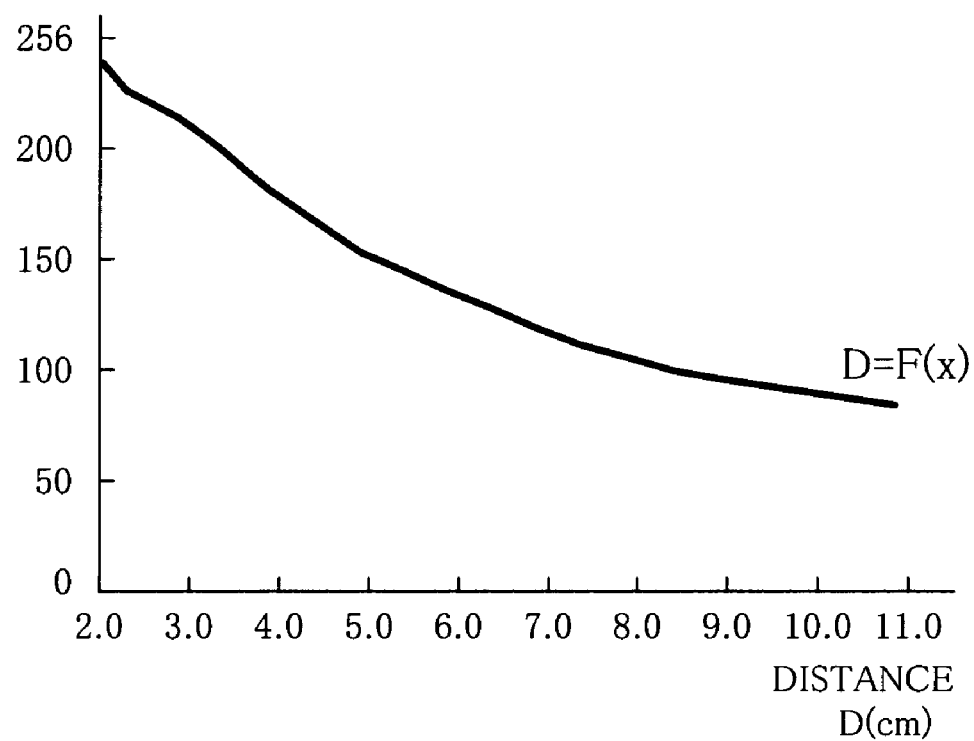
FIG. 6 shows a relationship between an output value of a distance measuring sensor and a real distance.

FIG. 1 is a perspective view showing an overall structure of an image taking device 1, FIG. 2 is a cross section of the image taking device 1 at the middle portion viewed from the side, FIG. 3 shows an example of a situation in taking an image of a left cheek, FIG. 4 shows an example of a connection between the image taking device 1 and a personal computer 6, FIG. 5 is a block diagram showing an example of a functional structure of the image taking device, and FIG. 6 shows a relationship between an output value of a distance measuring sensor 27 and a real distance.

The image taking device 1 according to the present invention includes an image taking device main body 2 and a main body cover 3 as shown in FIGS. 1 and 2. This image taking device 1 uses a lighting portion that emits infrared rays and a light receiving portion that receives reflected light of infrared rays. Thus, the image taking device 1 becomes a most suitable device for taking blood vessels of a human being or an animal. The lighting portion and the light receiving portion can be modified if necessary corresponding to a subject of image taking without limiting to those irradiating or receiving infrared rays. Hereinafter, the image taking device 1 will be described as a device for taking an image of blood vessels or the like of a human being or an animal.

When taking an image, the main body cover 3 is attached to the front face 20a of the image taking device main body 2 in advance. If a left cheek of a human face is a subject for example, the left cheek is opposed to the front face of the image taking device 1 as shown in FIG. 3 so that the left cheek becomes parallel with the front face of the image taking device 1 (namely, the left cheek that is a surface of the subject to be shot becomes perpendicular to an axis of shooting direction). Then, a shutter is released. Hereinafter, an example will be described in which an image of a blood vessel pattern of a human cheek is taken.

The image taking device main body 2 includes a casing (enclosure) 20, an image taking portion 21, a circuit board 22, a lighting portion 23, an interface 24, a shutter button 25, a distance measuring sensor (distance sensor) 27 and a lamp 28. The image taking device main body 2 can be connected to a personal computer 6 via the interface 24 as shown in FIG. 4.

The casing 20 has a box-like shape with an opened front face 20a.

The image taking portion 21 includes a lens 211 and an image sensor 212. As the image sensor 212, a CCD type image sensor or a CMOS type image sensor can be used, for example.

The circuit board 22 is provide with a control circuit for controlling each portion of the image taking device 1 that will be described later and for D/A conversion, a ROM for storing a computer program (firmware) and data, and a CPU. The CPU performs operational processes in accordance with an instruction from the personal computer 6 or the shutter button 25, the computer program, the data or the like. By this structure, the image taking device 1 realizes functions including a shutter control portion 201, an image processing portion 202, a position determining portion 203, a still determining portion 204, a distance calculating portion 205, a background image memory portion 206 and a posture determining portion 207 as shown in FIG. 5.

The lighting portion 23 has LEDs as light sources. As the LEDs, those emitting infrared rays are used if the subject is a blood vessel. Current that is supplied to LEDs is obtained from the personal computer 6 via the interface 24. If USB is used as the interface 24, communication with the personal computer 6 can be performed, and current can be supplied from the personal computer 6.

Referring FIGS. 1 and 2 again, the main body cover 3 includes a filter plate 31 made of a synthetic resin plate or a glass plate, and a lens cover 32 made of a synthetic resin plate. The main body cover 3 is attached to the front face 20a of the casing 20 with screws (not shown) or the like. The filter plate 31 is made of a material that cuts visible light and light having shorter wavelengths (i.e., light having wavelengths less than approximately 800 nm) and passes infrared rays, for example.

The distance measuring sensor 27, which is attached so as to be directed to the shooting direction, is used for measuring a distance between the distance measuring sensor 27 itself and an object of taking an image, i.e., a subject. As the distance measuring sensor 27, an optical type or an ultrasonic type distance measuring sensor (distance sensor) is used.

Furthermore, in this embodiment, the distance measuring sensor 27 that can measure three points on the surface of the subject (a subject surface) is used for determining a posture of the subject. Hereinafter, reference to a "distance to the subject (from the image taking device 1)" simply means an average value of distances between the image taking device 1 and the three points.

As the relationship between the distance measuring sensor 27 and each portion of the image taking device 1 is known in advance, a distance between each portion of the image taking device 1 and the subject can also be determined in accordance with a distance obtained by the distance measuring sensor 27. In this embodiment, a reference of a distance to the subject is defined as a front face 3c of the main body cover 3. Namely, a distance between the image taking device 1 and the subject is defined as a distance from the front face 3c of the main body cover 3 to the subject.

The distance measuring sensor 27 is set so that distances can be measured for three points including a vicinity of the base of a ear, a vicinity of the tip of the zygomatic bone (a vicinity of the portion under the outer corner of the eye) and the corner of the mouth if the cheek that is a subject is located at the place a few centimeters away from the image taking device 1 (see FIG. 3).

The distance between the image taking device 1 and one point on the subject is determined finally by the following method specifically. The distance measuring sensor 27 outputs a measured value of 8 bits, i.e., 256 gradation levels as a result of measurement of distance to one or more points on the surface of the subject (subject surface).

A relationship between a measured value (output value) and a real distance depends a little on a type of the subject, and has a tendency that the real distance to the subject becomes shorter as the measured value increases. For example, when a surface of a human body is measured, a relationship between a measured value and a real distance becomes as shown in the function "D=F(x)" as shown in FIG. 6. This function is obtained by real measurement while changing a position of the cheek little by little. Then, a distance between the image taking device 1 and one point on the subject is determined by assigning the measured value into the function corresponding to a type of the subject.

The distance calculating portion 205 shown in FIG. 5 calculates distances between the image taking device 1 and three points on the cheek by the method described above, namely in accordance with the function shown in FIG. 6 and the measured values (output values) about the three points on the cheek. The calculation result is given to the shutter control portion 201, the position determining portion 203 and the posture determining portion 207 as subject distance information 70.

The shutter control portion 201 instructs LED driving portions 261 and 262 to start supplying current to the LEDs 51a-51d and 52a-52d at the moment when the shutter button 25 is pressed and the shutter is released. Then, it instructs to stop the supply of current in accordance with an exposure time. Thus, each of the LEDs emits light in synchronization with the shutter release and the shutter speed (exposure time). Note that it is possible that the instruction for releasing the shutter is performed by the personal computer 6 instead of the shutter button 25.

When the shutter is released and each of the LEDs emits light, the light is irradiated to the cheek that is a subject. However, visible light and the like are cut by the filter plate 31, so only infrared rays are irradiated to the subject. In general, a blood vessel of a human being or an animal has characteristics of absorbing infrared rays. Therefore, a part of the surface of the cheek where blood vessels exist under the skin does not reflect the infrared rays so much, while a part without blood vessels reflects the infrared rays well.

The reflected light from the subject passes through the filter plate 31, enters the casing 20, and is focused by the lens 211 on the image sensor 212. The image sensor 212 converts the light to a signal so as to produce an image data.

The image processing portion 202 performs image processing on the image data so as to generate an image of a blood vessel pattern of the cheek. Note that it is possible to perform the image processing in the personal computer 6.

The shutter may be a mechanical shutter such as a lens shutter or a screen shutter, or an optical shutter such as a liquid crystal shutter. In addition, it is possible to start accumulation of charge by the image sensor 212 in synchronization with an instruction of taking an image and to finish the accumulation of charge or read the accumulated charge after the exposure time, for example. Namely, the exposure time in this structure means an accumulation time. Alternatively, it is possible to combine the mechanical, the optical and the electrical shutters.

The image taking device 1 is provided with a function for controlling the exposure and the shutter automatically, guiding a position and a posture of the subject, and extracting an area of the subject. By using these functions, an image can be taken more easily and in a high accuracy. Next, these functions will be described.

[Automatic Exposure Adjustment Function]

FIG. 7 shows an example of a distance exposure table TL1. The image taking device 1 is provided with the distance exposure table TL1 as shown in FIG. 5. The distance exposure table TL1 defines exposure times corresponding to a distance between the image taking device 1 and the subject as shown in FIG. 7. As understood from FIG. 7, the exposure time is set to a longer value as the distance between the image taking device 1 and the subject (the cheek) becomes longer. For example, if the distance to the image taking device 1 is 2.5 cm, the exposure time is set to 80 milliseconds. If it is 8.5 cm, the exposure time is set to 95 milliseconds.

Note that a "gain" in the distance exposure table TL1 indicates an output gain of the output signal S10 that is output from the image sensor 212 to the image processing portion 202. In FIG. 5, the adjustment signal S11 for adjusting the output gain is transmitted from the shutter control portion 201 or the like in accordance with the distance exposure table TL1. In addition, it is possible to adjust the output gain manually. An amplifier 208 amplifies the output signal S10. It is possible to eliminate the amplifier 208. It is possible that a gain of the amplifier 208 is variable and the gain is adjusted by the adjustment signal S11 so as to adjust the output gain of the output signal S10. In this case, it is possible to structure the amplifier 208 integrally inside the image sensor 212. Note that if the output signal S10 is digital data, a data converter may be used instead of the amplifier 208. In this example, the output gain is set to the same value despite the distance.

The shutter control portion 201 shown in FIG. 5 sets the exposure time in accordance with a distance to the subject calculated by the distance calculating portion 205 and the distance exposure table TL1 when an image is taken.

[Automatic Shutter Control Function]

The shutter control portion 201 gives an instruction to take an image automatically when the position and the posture of the subject become suitable for taking an image. More specifically, the instruction to take an image is given when three conditions are satisfied, which include a condition that the subject (the cheek) is positioned in a good shooting range, a condition that the cheek is in the posture to be opposed to the front face of the image taking device 1 in parallel (an axis along the shooting direction is substantially perpendicular to the plane of the cheek), and a condition that the cheek is static.

Note that the "good shooting range" means a range for taking an image having clarity higher than a predetermined level. Determination whether or not these conditions are satisfied is performed by the position determining portion 203, the still determining portion 204 and the posture determining portion 207 as follows.

The position determining portion 203 determines whether or not the subject (the cheek) is within the good shooting range of the image taking device 1 in accordance with the subject distance information 70 or the output value of the distance measuring sensor 27. The good shooting range for the cheek is the range where the distance from the image taking device 1 in the shooting direction is within the range of 2-9 cm, for example. Note that it is possible to determine it is in the good shooting range if all the three points on the cheek are in the good shooting range. It is also possible to determine it is in the good shooting range if one of the points is in the good shooting range. Such determination is performed at a predetermined time of interval (for example, 50 milliseconds).

The posture determining portion 207 obtains coordinates of the three points on the subject in accordance with the subject distance information 70 or the output value of the distance measuring sensor 27. Then, the posture determining portion 207 determines whether or not the axis along the shooting direction of the image taking device 1 is perpendicular to the plane including the three points on the subject. Namely, it determines whether or not the plane is parallel with the front face 20a of the image taking device 1 and the subject surface of the subject faces the image taking device 1 straightly. However, the term "perpendicular" in the above description means substantially perpendicular without limiting to the state perpendicular exactly by 90 degrees. For example, it is determined that the axis along the shooting direction is perpendicular to the subject surface and that the subject faces the image taking device 1 straightly if the angle between them is within a predetermined range, e.g., approximately 90±10 degrees. Otherwise, it is determined that the axis along the shooting direction is not perpendicular to the subject surface and that the subject does not face the image taking device 1 straightly.

The still determining portion 204 determines whether or not the subject that entered the good shooting range becomes still. Namely, it obtains the measured value of 8 bits about the three points on the subject from the distance measuring sensor 27 once every predetermined time (for example, 100 milliseconds). It observes variation of the measured value of each of the points for a predetermined period (for example, a few hundred milliseconds to a few seconds). Then, if the variation is smaller than a predetermined value for all period, it is determined that the subject is still. If it exceeds the predetermined value during the period, it is determined that the subject is not still. Alternatively, it is possible to determine whether or not the subject is still by observing the variation in the same manner as described above in accordance with the subject distance information 70 of the subject obtained from the distance calculating portion 205.

If it is determined that all the conditions are satisfied as results of these determinations, the shutter control portion 201 performs the automatic shutter control function. The exposure time in this case is an exposure time that is determined in accordance with a latest measured value (output value) by the distance measuring sensor 27.

[Guiding Function of a Position and a Posture of the Subject]

As described above, taking of an image by the automatic shutter control function is performed only when the subject (the cheek) is a position within the good shooting range, and is a posture that is parallel with the image taking device 1 (a posture in which the axis along the shooting direction is perpendicular to the subject surface) and is still. In order to satisfy these three conditions easily, the lamp 28 issues a sign for guiding the subject to a correct position and posture.

For example, the lamp 28 is turned off during the subject is not detected by the distance measuring sensor 27. When the subject is detected and is determined to enter the good shooting range by the position determining portion 203, the lamp 28 is made blink slowly (for example, every one second). When the posture determining portion 207 determines that a posture of the subject becomes straight to the image taking device 1, blinking speed the lamp 28 is increased (for example, every 0.5 seconds). When the still determining portion 204 determines that the subject becomes still, the lamp 28 is made stop blinking and stay on. Alternatively, three lamps may be prepared for the three conditions, respectively. Then, if a condition is satisfied, the corresponding lamp is turned on.

It is possible to provide a speaker to the image taking device 1 instead of the lamp 28 and to produce a sound message like "Please don't move" or "Please turn your face a little to the left" so as to guide the position and the posture of the subject. Alternatively, it is possible to provide a liquid crystal panel and to display a message, a figure, a picture, a photograph or an image for guiding. It is possible to use a speaker or a display device of the personal computer 6 for guiding.

[Extraction of the Subject (a Process of Removing a Background)]

If the image taking device 1 is substantially close to the subject, an image of the subject without other objects, i.e., without a background can be obtained. However, if a distance between them is large to some extent, or if the subject is small, the obtained image may include a background. Therefore, each portion of the image taking device 1 performs the following process for extracting the area of the subject.

During the distance measuring sensor 27 does not detect the subject, the shutter control portion 201, the image processing portion 202 and the image taking portion 21 performs a process for taking an image of the background. This process is performed regularly (for example, every few minutes to every few tens of minutes). The obtained image is stored and accumulated as background image data 80 in the background image memory portion 206. Note that if the background image data 80 are already accumulated, the old background image data 80 are deleted and new background image data 80 are accumulated.

The automatic shutter control function and others perform the process of taking an image of the subject, and an area of blood vessels included in the obtained image is extracted in accordance with the background image data 80. Namely, corresponding pixels are compared between the obtained image and the background image. If the difference between the pixels is above a predetermined threshold level, it is determined that the pixel belongs to the image of the subject. Otherwise, it is determined that the pixel belongs to the image of the background. Thus, the area of the cheek that is a subject is extracted.

Figure 8:
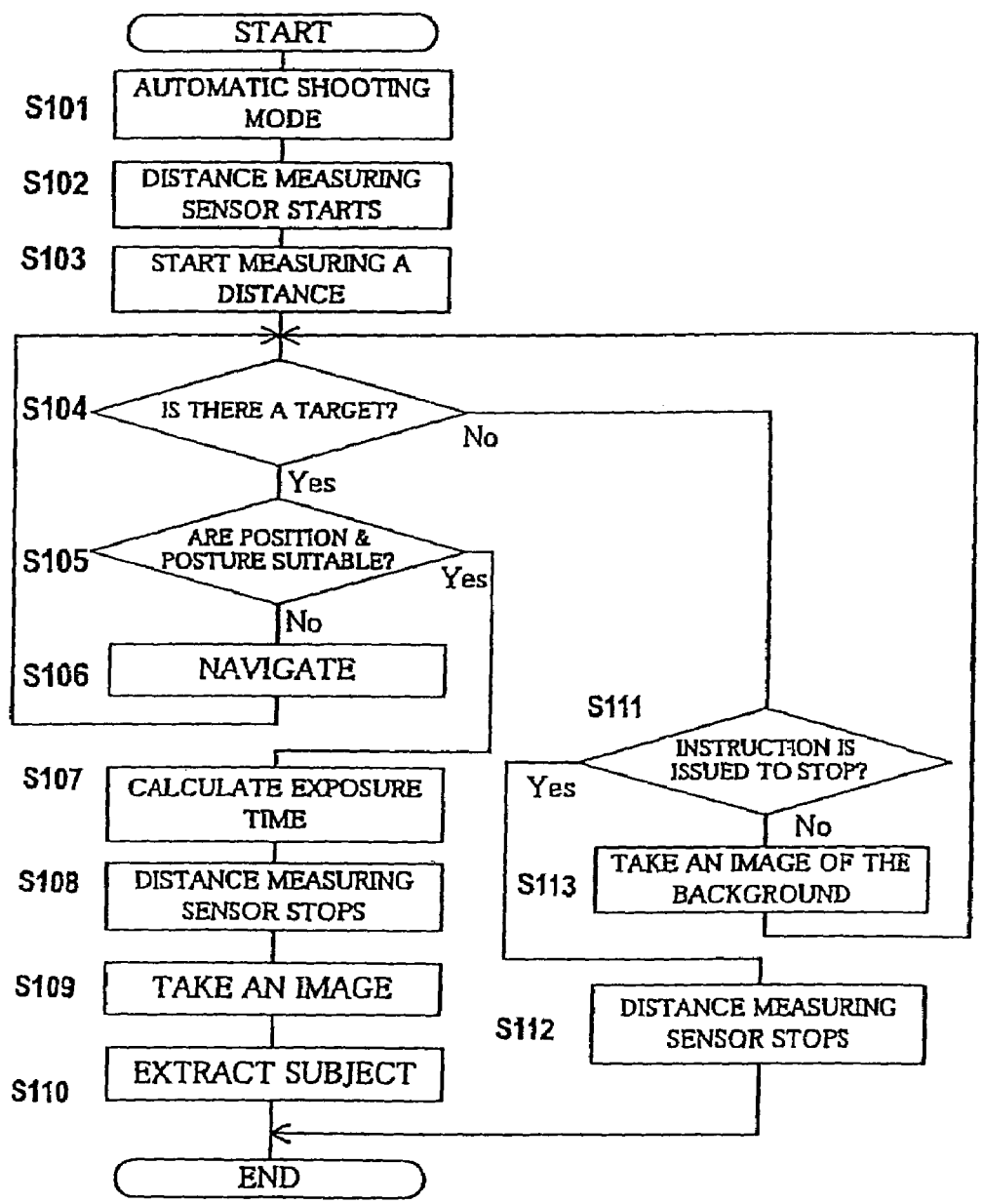
FIG. 8 is a flowchart showing an example of a flow of a process when the image taking device takes an image.

FIG. 8 is a flowchart showing an example of a flow of a process when the image taking device 1 takes an image. Next, when using functions described above including automatic exposure adjustment, automatic shutter control, guiding of the position and the posture, and extracting of the area of the subject, a flow of the process in the image taking device 1 will be described with reference to a flowchart shown in FIG. 8.

An operator operates operational buttons of the image taking device 1 or a keyboard of the personal computer 6 so as to switch the image taking device 1 to an automatic shooting mode S101. Then, the distance measuring sensor 27 is activated S102 and starts measuring a distance between the image taking device 1 and an object placed at the front face thereof S103. Note that the measurement is repeated until the exposure time is calculated S107 or the process is finished at a predetermined time interval (for example, every 100 millisecond).

If there is a change in the measurement result, it is determined that an object person appeared at the front face of the image taking device 1 (Yes in S104). The object person makes his or her cheek close to the front face of the image taking device 1. The image taking device 1 determines whether the position and the posture of the cheek become suitable for taking an image S105.

If they are not suitable position and posture for taking an image (No in S105), the lamp 28 or a speaker is used for guiding the cheek to the suitable position and posture S106. Then, the determination is repeated until the position and the posture of the cheek becomes suitable.

If all these conditions are satisfied (Yes in S104 and Yes in S105), the distance exposure table TL1 is referred for determining the exposure time S107. Then, the distance measuring sensor 27 is stopped S108, and an image of the cheek is taken in accordance with the calculated exposure time so as to obtain an image including the cheek S109.

If a cheek does not appear at the front face of the image taking device 1 and an instruction is issued to stop taking an image (No in S104 and Yes in S111), the distance measuring sensor 27 is stopped S112 and the automatic shooting process is stopped. If a cheek does not appear at the front face of the image taking device 1 but there is no instruction to stop taking an image (No in S104 and No in S111), an image of the background is taken if necessary (for example, if a few minutes have passed since the last time of taking an image of the background) S113.

After obtaining the image including the cheek in Step S109, an image that includes only the cheek is extracted from the image S110.

[Personal Recognition Process]

Figure 9:
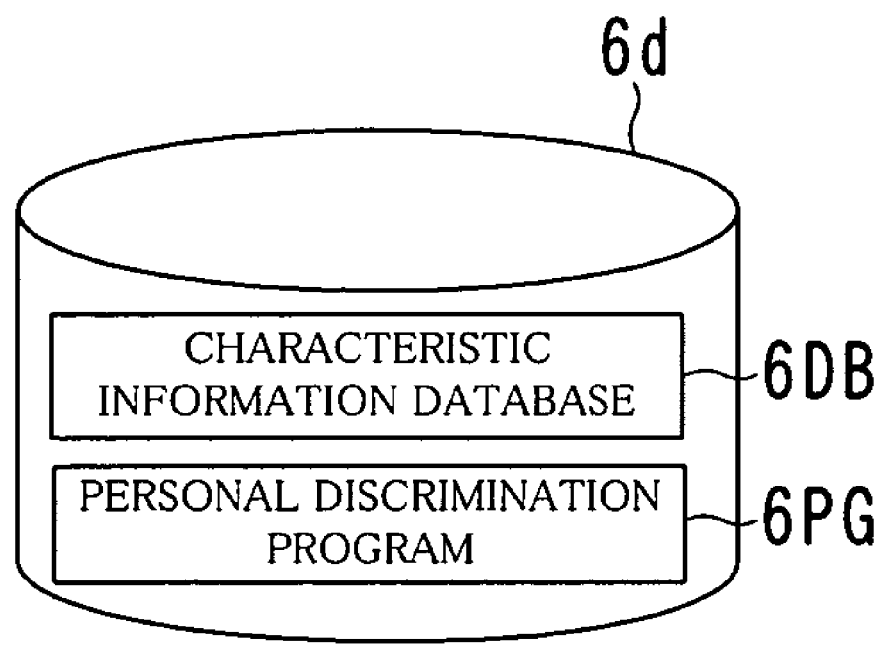
FIG. 9 shows an example of a program and data stored in a magnetic storage device.
Figure 10:
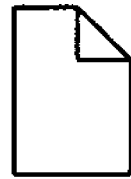
FIG. 10 shows an example of a characteristic information database.
Figure 10:
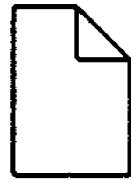
Figure 10:
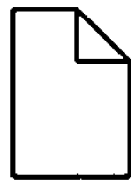
Figure 11:
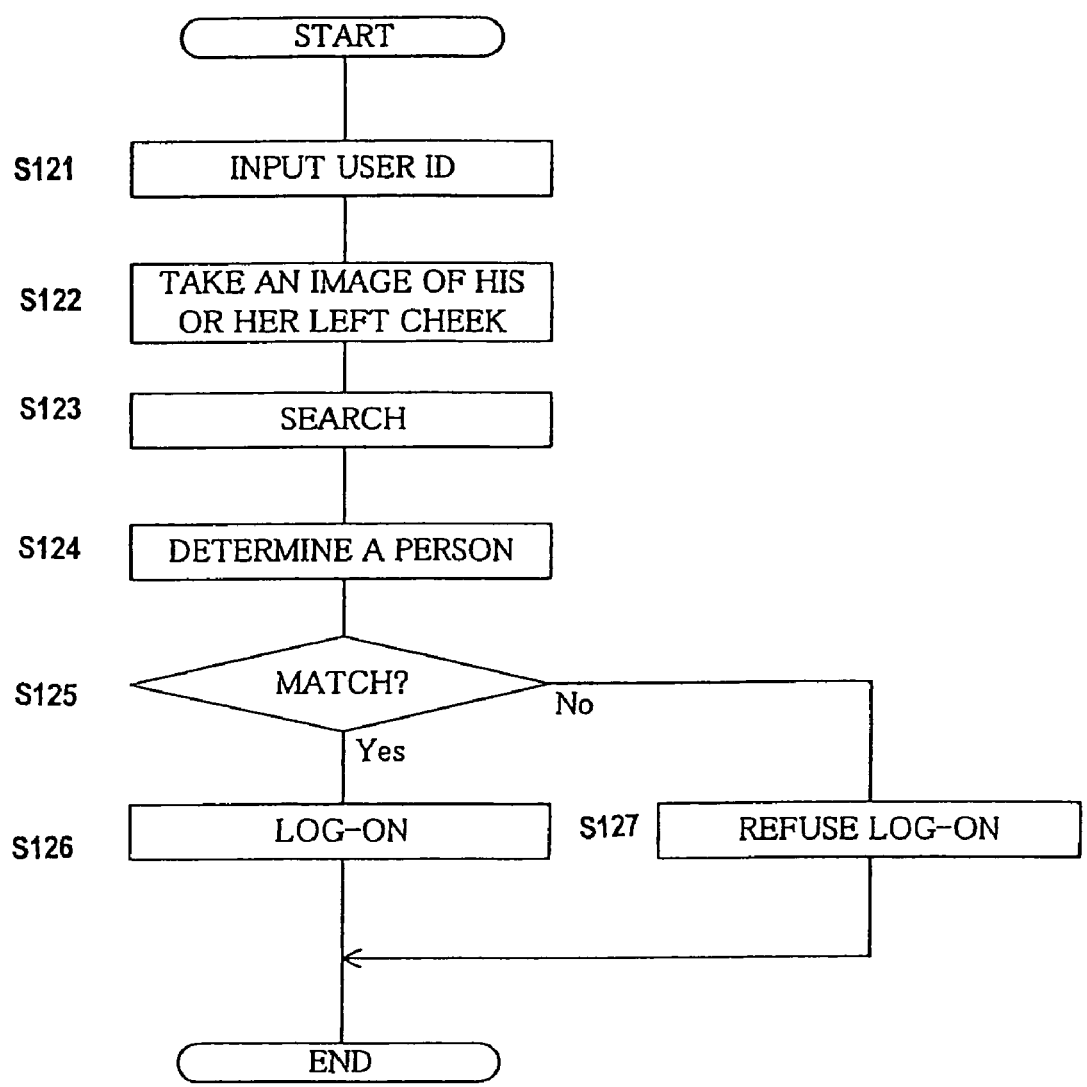
FIG. 11 is a flowchart showing an example of a flow of a personal discrimination.

FIG. 9 shows an example of a program and data stored in a magnetic storage device 6d, FIG. 10 shows an example of a characteristic information database 6DB, FIG. 11 is a flowchart showing an example of a flow of a personal discrimination.

Following description is a case where the image taking device 1 is used for personal recognition process. For example, a case will be described in which a process of logging on the personal computer 6 shown in FIG. 4 is exemplified.

The magnetic storage device 6d in the personal computer 6 stores the characteristic information database 6DB as shown in FIG. 9. This characteristic information database 6DB stores characteristic information 71 (71a, 71b, ...) of each user in connection with a user ID for discriminating the user as shown in FIG. 10.

The characteristic information 71 is information about characteristics of each user. In this embodiment, information about blood vessels in the left cheek is used as the characteristic information 71. The characteristic information 71 is obtained in advance by taking an image of the left cheek of each user by the image taking device 1. It is possible to store the characteristic information 71 as an image of the blood vessel pattern, or as information indicating characteristics such as a thickness, a length, the number or an arrangement of blood vessels that is obtained by analyzing the image.

In addition, a personal discrimination program 6PG is installed in the magnetic storage device 6d. Performing this program, a process for determining which user is logging on is realized by the process as shown in the flowchart in FIG. 11.

A user who wants to use the personal computer 6 turns on the switch of the personal computer 6. Then, a log-on screen is displayed on the personal computer 6. Here, the user enters his or her user ID S121, and lets the image taking device 1 take an image of his or her left cheek S121. The entered user ID and image data obtained by taking the image are transmitted to the personal computer 6.

The personal computer 6 searches characteristic information 71 corresponding to the user ID from the characteristic information database 6DB S123. Then, the personal computer 6 determines whether or not the user is a regular user by determining whether or not the characteristics of blood vessels indicated by the characteristic information 71 match the characteristics of blood vessels indicated by the image data obtained by taking the image S124.

If it is determined that the user is a regular user (Yes in S125), the user can log on for using the personal computer 6 S126. If the user is not determined to be a regular user (No in S125), a message indicating that the user cannot log on and urging the user to operate again is displayed S127.

Alternatively, it is possible that the personal computer 6 discriminates who is the user by performing the process in Step S124 sequentially for the characteristic information 71a, 71b, ... stored in the characteristic information database 6DB, so as to determine to permit the log-on or not. In this case, it is not necessary to enter the user ID in the log-on screen.

The application of the personal discrimination is not limited to the user check for log-on as described above, but it can also be performed for personal authentication in payment by an electronic payment system or in checking the times of arrival and departure (as a time card), for example.

According to this embodiment, a precise image can be taken even by a noncontact type device by adjusting exposure to light in accordance with a distance between the image taking device and the subject. By guiding the subject to a position and a posture suitable for taking an image, a more precise image can be taken. In addition, an image that includes only the subject without a background can be extracted more correctly and inexpensively than the conventional device.

Although the exposure time is set to a larger value as a distance to the subject is larger and the gain of the output of the image sensor 212 is set to a constant value regardless of the distance as shown in FIG. 7 in this embodiment, it is possible to set the gain to a larger value as the distance is larger and to set the exposure time to a constant value. Alternatively, it is possible to change the both.

It is possible to take the image of the background just after taking the image of the subject. Namely, it is possible to take the image of the background when the distance measuring sensor 27 becomes not to detect the subject after taking the image of the subject. It is possible to move the image taking device 1 so as to adjust the relationship between positions of the subject and the image taking device 1 if the subject is not in the position and the posture suitable for taking an image. It is possible to use CCD instead of the CMOS sensor as the image sensor 212.

Though an image of a blood vessel pattern of a cheek of a human being is taken by the image taking device 1 in this embodiment, it is of course possible to take an image of other part of a human or an animal body. It is possible to take an image of various surface of a forehead, a head portion, an abdomen, a back, a hip, a neck, a limb, an, and a leg and other parts, for example. In this case, a condition such as an arrangement of LEDs, an intensity of LEDs, an adjustment of the automatic exposure, a position or a posture is changed in accordance with the part to be an object of taking an image, so as to structure the image taking device 1.

It is possible to take an image of an object other than a human being or an animal. For example, it is possible to use the image taking device 1 for a survey on traffic of automobiles. In this case, the system may be structure as follows.

The image taking device 1 is placed at the side of the road (on a sidewalk). The shooting direction is set to face the other side of the road. The good shooting range is set to the range from one side to the other side of the road. Images of cars are prepared for each type in the database.

As the light source that is used for the lighting portion 23, a usual strobe light for a camera is used, for example. In this case, the filter plate 31 is a transparent place. The table for determining a condition of the automatic exposure (see FIG. 7) is changed in accordance with a width of the road and an environment for taking an image. The timing for lighting may be just after it is determined that a car is approaching. It is possible to change the intensity of light in inverse proportion to the distance to a car. Other than that, the structure of the image taking device 1 is changed in accordance with a width of the road and the environment for taking an image.

If the distance measuring sensor 27 does not detect a car, the image of the background is obtained regularly. When the distance measuring sensor 27 detects a car and it is determined that the car is approaching, a distance to the car is determined for deciding an exposure time in accordance with the distance. An image of a car is taken by the exposure time so that the image is obtained. Only a part of the car is extracted from the obtained image.

The extracted image of the car is compared with each of the images prepared in the database about characteristic information such as color information component, an edge component or a face component, so that a type of the detected car is specified. Then, the data of traffic are updated. Alternatively, it is possible to take a three-dimensional image and to specify a type of the car by comparing characteristic information of appearance image information reproduced from three-dimensional structural information, or a color information component, an edge component, or a face component.

In the same manner as the survey on traffic of automobiles, it is possible to carry out a survey on the number of people who walk along a corridor or a pavement. In this case, a range between both side walls of the corridor or a range of a width of the road is considered as the good shooting range. The image taking device 1 may be placed on the wall or the like, while the distance measuring sensor 27 may be placed at the vicinity of footing. In addition, the structure of the image taking device 1 or others may be changed in accordance with these conditions. Alternatively, in order to recognize a person in front of a door such as an automatic door for example, a range from the door to the wall is regarded as the good shooting range and the image taking device 1 is placed at the upper portion of the door. The structure of the image taking device 1 or others may be changed in accordance with these conditions.

There may be a case where though it was detected that the object to be shot was approaching, the object has passed when an image is taken. Namely, it is the case where an error of taking an image occurs. In this case, in order to reduce process errors afterward, it is possible to perform the following process. When an image of the object is taken, the distance measuring sensor 27 obtains a position (a distance) of the object again. As a result, if the position of the object is not within the good shooting range, it is high probability that the image was taken after the object has passed. Therefore, in this case, the obtained image is compared with the background image so as to determine whether or not the object is in the image. If the object is not in the image, it is regarded that the object was not approaching.

Though distances between the image taking device 1 and three points on the subject in this embodiment, it is possible to measure distances to one or two points. For example, if the object can stand straight like a suit case when taking an image, distances between the image taking device 1 and two points on the subject may be measured. It is because that it is detected that the image taking device 1 is parallel with the subject if a distance to one point on the surface of the subject (the subject surface) is equal to a distance to another point. Alternatively, in order to take an image of a car running on the road, it is sufficient to measure for one point. It is because a car runs substantially in parallel with the image taking device 1.

It is possible to output the recognition result of a person or a type of an object (a type of cars, for example) by a display device or a printer device. It is possible to transmit the result to other electronic system or device via a network, or to record the result in a recording medium. It is possible to draw an illustration on the surface of the main body cover 3 for indicating the shooting direction. For example, if the image taking device 1 takes an image of a sole, an illustration of a foot may be drawn on the surface of the main body cover 3.

Furthermore, the structure of the entire or each part of the image taking device 1, the object of taking an image, the arrangement and intensities of the LEDs, the arrangement of the optical system including the lens, the contents of the processes, the order of the processes, the contents of the database, the structure of the screens and others can be modified if necessary in accordance with the spirit of the present invention.

INDUSTRIAL APPLICABILITY

As described above, the present invention is useful in that even a noncontact type device can take a precise image by adjusting exposure to light in accordance with a distance between the image taking device and the subject.

The invention claimed is:

1. An image taking device for taking an image of an object by focusing reflected light from the object on a light receiving portion, comprising:
    a measuring portion that measures distances between the image taking device and at least two points in a subject surface of the object;
    an exposure control portion that controls exposure time of the light receiving portion upon taking the image in accordance with at least one of the distances measured;
    a posture determining portion that determines whether the subject surface is perpendicular to an axis along a shooting direction of the image taking device in accordance with the distances measured; and
    an image taking portion that takes the image if it is determined by the posture determining portion that the subject surface is perpendicular to the axis and one of the distances measured is within a predetermined range.

2. The image taking device according to claim 1, further comprising a guiding portion that outputs guidance so that the subject surface is perpendicular to the axis by producing different signs between a first case where it is determined that the subject surface is perpendicular to the axis and a second case where it is determined that the subject surface is not perpendicular to the axis.

3. An image taking device for taking an image of an object by focusing reflected light from the object on a light receiving portion, comprising:
a measuring portion that measures a first distance between the object and the image taking device at a first time and a second distance between the object and the image taking device at a second time;
an exposure control portion that controls exposure time of the light receiving portion upon taking the image in accordance with at least one of the first distance measured and the second distance measured;
a still determining portion that determines whether the object is still in accordance with the first distance measured and the second distance measured;
an image taking portion that takes the image if it is determined by the still determining portion that the object is still and at least one of the first distance measured and the second distance measured is within a predetermined range.

4. An image taking device for taking an image of an object by focusing reflected light from the object on a light receiving portion, comprising:
a measuring portion that measures a distance between the object and the image taking device;
an exposure control portion that controls exposure time of the light receiving portion upon taking the image in accordance with the distance measured;
an image taking portion that takes the image if it is determined by the measuring portion that the distance is within a predetermined range;
a background storage portion that stores a background image that is taken when the object is not detected; and
an extracting portion that extracts a part of the object from the image by comparing the background image with the image.

5. A method for taking an image of an object by using an image taking device that focuses reflected light from the object on a light receiving portion, the method comprising:
measuring distances between the image taking device and at least two points in a subject surface of the object;
controlling exposure time of the light receiving portion upon taking the image in accordance with at least one of the distances measured;
determining whether the subject surface is perpendicular to an axis along a shooting direction of the image taking device in accordance with the distances measured; and
taking the image if it is determined in said determining that the subject surface is perpendicular to the axis and one of the distances measured is within a predetermined range.

6. A computer-readable storage storing a computer program for controlling an image taking device including a light receiving portion for receiving reflected light from an object and a distance measuring sensor, the computer program which when executed by a computer makes the computer execute a process comprising:
making the distance measuring sensor measure distances between the image taking device and at least two points in a subject surface of the object;
controlling exposure time of the light receiving portion upon taking the image in accordance with at least one of the distances measured;
determining whether the subject surface is perpendicular to an axis along a shooting direction of the image taking device in accordance with the distances measured; and
taking the image if it is determined in said determining that the subject surface is perpendicular to the axis and one of the distances measured is within a predetermined range.

7. The computer-readable storage according to claim 6, the process further comprising outputting guidance so that the subject surface is perpendicular to the axis by producing different signs between a first case where it is determined that the subject surface is perpendicular to the axis and a second case where it is determined that the subject surface is not perpendicular to the axis.

8. The method according to claim 5, further comprising outputting guidance so that the subject surface is perpendicular to the axis by producing different signs between a first case where it is determined that the subject surface is perpendicular to the axis and a second case where it is determined that the subject surface is not perpendicular to the axis.

9. An image taking device for taking an image of an object by focusing reflected light from the object on a light receiving portion that converts the light into an electric signal, comprising:
a measuring portion that measures distances between the image taking device and at least two points in a subject surface of the object;
a gain control portion that controls an output gain of the electric signal in accordance with at least one of the distances measured;
a posture determining portion that determines whether the subject surface is perpendicular to an axis along a shooting direction of the image taking device in accordance with the distances measured; and
an image taking portion that takes the image if it is determined by the posture determining portion that the subject surface is perpendicular to the axis and one of the distances measured is within a predetermined range.

10. The image taking device according to claim 9, further comprising a guiding portion that outputs guidance so that the subject surface is perpendicular to the axis by producing different signs between a first case where it is determined that the subject surface is perpendicular to the axis and a second case where it is determined that the subject surface is not perpendicular to the axis.

11. An image taking device for taking an image of an object by focusing reflected light from the object on a light receiving portion, comprising:
a measuring portion that measures a first distance between the object and the image taking device at a first time and a second distance between the object and the image taking device at a second time;
a gain control portion that controls an output gain of the electric signal in accordance with at least one of the first distance measured and the second distance measured;
a still determining portion that determines whether the object is still in accordance with the first distance measured and the second distance measured;
an image taking portion that takes the image if it is determined by the still determining portion that the object is still and at least one of the first distance measured and the second distance measured is within a predetermined range.

12. An image taking device for taking an image of an object by focusing reflected light from the object on a light receiving portion, comprising:
a measuring portion that measures a distance between the object and the image taking device;

a gain control portion that controls an output gain of the electric signal in accordance with the distance measured;

an image taking portion that takes the image if it is determined by the measuring portion that the distance is within a predetermined range;

a background storage portion that stores a background image that is taken when the object is not detected; and an extracting portion that extracts a part of the object from the image by comparing the background image with the image.

13. A method for taking an image of an object by using an image taking device that focuses reflected light from the object on a light receiving portion, the method comprising:

measuring a first distance between the object and the image taking device at a first time and a second distance between the object and the image taking device at a second time;

controlling exposure time of the light receiving portion upon taking the image in accordance with at least one of the first distance measured and the second distance measured;

determining whether the object is still in accordance with the first distance measured and the second distance measured; and taking the image if it is determined in said determining that the object is still and at least one of the first distance measured and the second distance measured is within a predetermined range.

14. A method for taking an image of an object by using an image taking device that focuses reflected light from the object on a light receiving portion, the method comprising:

measuring a distance between the object and the image taking device;

controlling exposure time of the light receiving portion upon taking the image in accordance with the distance measured;

taking the image if it is determined in said measuring that the distance is within a predetermined range;

storing a background image that is taken when the object is not detected; and extracting a part of the object from the image by comparing the background image with the image.

15. A computer-readable storage storing a computer program for controlling an image taking device including a light receiving portion for receiving reflected light from an object and a distance measuring sensor, the computer program which when executed by a computer makes the computer execute a process comprising:

measuring a first distance between the object and the image taking device at a first time and a second distance between the object and the image taking device at a second time;

controlling exposure time of the light receiving portion upon taking the image in accordance with at least one of the first distance measured and the second distance measured;

determining whether the object is still in accordance with the first distance measured and the second distance measured; and taking the image if it is determined in said determining that the object is still and at least one of the first distance measured and the second distance measured is within a predetermined range.

16. A computer-readable storage storing a computer program for controlling an image taking device including a light receiving portion for receiving reflected light from an object and a distance measuring sensor, the computer program which when executed by a computer makes the computer execute a process comprising:

measuring a distance between the object and the image taking device;

controlling exposure time of the light receiving portion upon taking the image in accordance with the distance measured;

taking the image if it is determined in said measuring that the distance is within a predetermined range;

storing a background image that is taken when the object is not detected; and extracting a part of the object from the image by comparing the background image with the image.

* * * * *

UNITED STATES PATENT AND TRADEMARK OFFICE
CERTIFICATE OF CORRECTION

| | | |
|---|---|---|
| PATENT NO. | : 7,522,824 B2 | Page 1 of 1 |
| APPLICATION NO. | : 10/550489 | |
| DATED | : April 21, 2009 | |
| INVENTOR(S) | : Satoshi Fukui et al. | |

It is certified that error appears in the above-identified patent and that said Letters Patent is hereby corrected as shown below:

Title Page, item [54] Column 1 (Title), Lines 1-3, change "PHOTOGRAPHING APPARATUS PHOTOGRAPHING METHOD AND COMPUTER PROGRAM" to --IMAGE TAKING DEVICE, IMAGE TAKING METHOD AND COMPUTER PROGRAM--.

Title Page, item [75] Column 1 (Inventors), Line 4, change "Kato" to --Daito--.

Column 1, Lines 1-3, change "PHOTOGRAPHING APPARATUS PHOTOGRAPHING METHOD AND COMPUTER PROGRAM" to --IMAGE TAKING DEVICE, IMAGE TAKING METHOD AND COMPUTER PROGRAM--.

Signed and Sealed this

Eighteenth Day of August, 2009

David J. Kappos
*Director of the United States Patent and Trademark Office*